United States Patent [19]

Olson

[11] 4,303,709
[45] Dec. 1, 1981

[54] COEXTRUDED LAMINAR THERMOPLASTIC BAGS

[75] Inventor: Robert H. Olson, Pittsford, N.Y.

[73] Assignee: Mobil Oil Corporation, New York, N.Y.

[21] Appl. No.: 103,318

[22] Filed: Dec. 14, 1979

Related U.S. Application Data

[63] Continuation of Ser. No. 865,088, Dec. 27, 1977, abandoned.

[51] Int. Cl.³ .............................................. B32B 27/08
[52] U.S. Cl. ...................................... 428/35; 428/516; 428/220; 156/244.11
[58] Field of Search ................. 428/35, 516, 500, 518, 428/220; 156/244.11

[56] References Cited

U.S. PATENT DOCUMENTS

| | | | |
|---|---|---|---|
| 3,481,804 | 12/1969 | Snyder | 156/82 |
| 3,496,061 | 2/1970 | Freshour et al. | 428/516 |
| 3,579,416 | 5/1971 | Schrenk | 428/516 |
| 4,147,827 | 4/1979 | Breidt et al. | 428/913 |
| 4,211,825 | 7/1980 | Shipman | 428/483 |

FOREIGN PATENT DOCUMENTS 1440317  10/1973  United Kingdom .

*Primary Examiner*—George F. Lesmes
*Assistant Examiner*—E. Rollins Buffalow
*Attorney, Agent, or Firm*—Charles A. Huggett; Michael G. Gilman; James P. O'Sullivan, Sr.

[57] ABSTRACT

A thermoplastic bag particularly adapted for the containment and storage of foods comprising a laminar bag structure having an interior layer of a high density polyethylene copolymer and an exterior layer of polypropylene. The layers are intimately and continuously bonded together at their interface. Such bag structures are suitable for the containment of foodstuffs while they are being heated or reheated following storage.

5 Claims, No Drawings

COEXTRUDED LAMINAR THERMOPLASTIC BAGS

This is a continuation of application Ser. No. 865,088, filed Dec. 27, 1977, now abandoned.

BACKGROUND OF THE INVENTION

I. Field of the Invention

The present invention relates to thermoplastic bag structures which have been fabricated from a thermoplastic film laminate comprising two layers of film which are formed from dissimilar thermoplastic resins.

II. Description of the Prior Art

In the past, polyethylene bags have been used for food storage and, in particular, refrigerated food storage. Such food container bags are particularly convenient for the storage of food left-overs which may be intended for later reheating. The bulk of such food storage bags have been formed from low density, i.e. 0.91 to about 0.93 g/cc., polyethylene. For reheating purposes, foodstuffs must be removed from such low density polyethylene bags because of their tendency to partially melt and adhere to the surfaces of cooking vessels at temperatures on the order of 212° F. and below.

To remedy this deficiency of low density polyethylene bags, attempts have been made to employ polyester bags, such as polyethylene terephthalate, for such elevated temperature applications as "boil" bags, however such films are difficult to seal and more importantly are prohibitively expensive for such disposable bag applications.

SUMMARY OF THE INVENTION

The present invention provides for an economical thermoplastic bag which may be employed to contain foods during storage and, most importantly, may be used to contain such foods during reheating preparatory to serving. The bag structures of the present invention comprise a two layer laminar structure, the inner bag layer, or that surface layer in contact with the foodstuffs, being formed from polyethylene and preferably a high density ethylene copolymer. The outer layer of the bag laminate, or that surface of the bag which comes into direct contact with the cooking or reheating vessel, comprises a ply of relatively thin polypropylene film. The outer polypropylene film layer maintains the inner more thermally susceptable polyethylene layer out of contact with the surfaces of the cooking vessel and hence improves the bag's ability to withstand higher temperatures. The polypropylene layer, having a melting or sticking temperature on the order of above 150° C. is stable and will not stick to the vessel side walls while foodstuffs are being reheated therein. Obviously the bag containing foodstuffs is intended to be immersed in a fluid such as water during the reheating operation. Accordingly, the present invention provides laminar bags for the optimum storage and containment of foodstuffs which may then be reheated without first removing them from the bag. The bag is constructed from a two-ply laminate comprising an inner film layer of a high density ethylene-α-olefin copolymer and an outer layer of polypropylene film. The high density ethylene copolymer preferably comprises ethylene which has been copolymerized with a minor amount, on the order of less than 10%, of octene-1.

DESCRIPTION OF SPECIFIC EMBODIMENTS

A tubular thermoplastic laminate was prepared utilizing conventional blown tubular film coextrusion techniques whereby the final inner-tube layer comprised a 1.0 mil thick layer of high density polyethylene copolymer and a 0.2 mil thick outer layer of polypropylene. The continuous laminar tube was subsequently converted into bag structures utilizing techniques well known in the prior art. The high density polyethylene copolymer inner layer was a copolymer of ethylene and about 3% by weight of octene-1. This resin is identified by the manufacturer as Alathon 7810 and has the following typical physical properties for a 1.25 mil film extruded at a 4.3/1 blow-up ratio:

| | | |
|---|---|---|
| Density .945 g/cc | | |
| Melt Index .25 g/10 min. | | |
| Tensile Yield | (MD) | 3,000 psi |
| | (TD) | 3,100 psi |
| Elongation | (MD) | 660% |
| (2"/min.) | (TD) | 730% |
| Secant Modulus | (MD) | 80M psi |
| | (TD) | 82M psi |
| Elmendorf Tear | (MD) | 45 gm/mil |
| | (TD) | 247 gm/mil |
| Spencer Impact | | 2.8 in. lbs/mil |
| Dart Drop (26") | | 115 gm/mil |
| Tear Propagation | (MD) | 3.2 Kg force |
| ASTM D-2582 | (TD) | 3.7 Kg force |

The polypropylene outer layer was fabricated from resin identified by the manufacturer as Tenite 612 F which has the following typical physical properties:

| | |
|---|---|
| Density | .902 g/cc |
| Flow Rate | 4.5 g/10 min. |
| Tensile, Yield | 5000 psi |
| Vicat Softening Point | 145° C. |

The two ply laminated film comprising integrally adhered layers of the high density ethylene-octene-1 copolymer and the polypropylene outer layer had the following physical properties:

| | | |
|---|---|---|
| Film Gauge | | 1.20 mil. |
| Blow-up Ratio | | 2.5/1 |
| Tensile Yield | (MD) | 3200 psi |
| | (TD) | 3400 psi |
| Elongation | (MD) | 525% |
| | (TD) | 850% |
| Tear - Elmendorf | (MD) | 24 gms/mil |
| | (TD) | 477 gms/mil |
| Modulus | (MD) | 80 M psi |
| | (TD) | 105 M psi |

For purposes of the present invention the thickness of the inner high density polyethylene copolymer layer may vary from about 0.5 mils up to about 3.0 mils and is preferably 1.0 mils thick. The outer polypropylene layer may vary from about 0.1 mil up to about 3.0 mil in thickness and is preferably about 0.2 mil thick.

Although the present invention has been described with preferred embodiments, it is to be understood that modifications and variations may be resorted to, without departing from the spirit and scope of this invention, as those skilled in the art will readily understand. Such modifications and variations are considered to be within the purview and scope of the appended claims.

What is claimed is:

1. A two-layer coextruded, thermoplastic laminar bag construction particularly suitable for the containment of food which has to be heated in aqueous media, said aqueous media being maintained at temperatures of up to about 212° F., consisting of a continuous outer layer of polypropylene film and a continuous inner film layer of a high density ethylene-octene-1 copolymer, said copolymer comprising less than about 10% by weight of octene-1 and having a density of about 0.945 g/cc.

2. A plastic laminar bag construction in accordance with claim 1 wherein said polypropylene film layer has a thickness of from about 0.1 up to about 0.2 mil.

3. The thermoplastic bag of claim 1 wherein the high density polyethylene copolymer consists essentially of ethylene copolymerized with about 3% by weight of octene-1 and has a density of about 0.945 g/cc.

4. The bag of claim 3 wherein the bag construction consists essentially of said copolymer layer of about 0.5 to 3 mils thickness integrally adhered to a polypropylene layer of about 0.1–0.2 mils thickness and layers being coextruded.

5. The bag of claim 4 wherein the two-layer film has an overall thickness of about 1.2 mil.

* * * * *